US012787919B2

(12) United States Patent
Conrad

(10) Patent No.: US 12,787,919 B2
(45) Date of Patent: Nov. 10, 2026

(54) ROTATING MOWER BLADE ASSEMBLY WITH COMPRESSION SPRING BLADE RETENTION

(71) Applicant: DEERE & COMPANY, Moline, IL (US)

(72) Inventor: Ethan C. Conrad, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 311 days.

(21) Appl. No.: 18/653,628

(22) Filed: May 2, 2024

(65) Prior Publication Data

US 2025/0338794 A1 Nov. 6, 2025

(51) Int. Cl.
*A01D 34/73* (2006.01)
*A01D 101/00* (2006.01)

(52) U.S. Cl.
CPC ........ *A01D 34/733* (2013.01); *A01D 2101/00* (2013.01)

(58) Field of Classification Search
CPC .. A01D 34/733; A01D 34/736; A01D 34/661; A01D 34/664; A01D 34/52; A01D 34/535; A01D 34/73; A01F 12/40; A01F 29/02; F16B 5/0016; F16B 21/06; F16B 21/09; F16B 33/002
See application file for complete search history.

(56) References Cited

U.S. PATENT DOCUMENTS 3,604,189 A 9/1971 Harer et al.
3,656,286 A * 4/1972 Glunk .................. A01D 34/736 56/295
3,918,241 A * 11/1975 Stillions ............... A01D 34/733 56/295
4,525,990 A * 7/1985 Zweegers ............ A01D 34/736 56/13.6
4,550,933 A * 11/1985 Patterson ................ B60R 22/20 280/801.2
8,510,959 B2 * 8/2013 Whitenight .......... A01D 34/733 56/255

(Continued)

FOREIGN PATENT DOCUMENTS

EP 4230021 A1 8/2023
EP 4292421 A2 12/2023

OTHER PUBLICATIONS

Extended European Search Report and Written Opinion issued in European Patent Application No. 25169603.5 dated Sep. 2, 2025, in 04 pages.

*Primary Examiner* — Robert E Pezzuto

(57) ABSTRACT

A rotating blade assembly includes a disc defining a mounting aperture extending therethrough. A blade includes a body having an upper blade surface arranged opposite a lower disc surface of the disc. The blade defines a pin aperture extending therethrough. A fastener includes a head portion engaged against a lower blade surface and a shaft portion extending through the pin aperture of the blade and the mounting aperture of the disc. A cap is coupled to a distal end of the fastener. A spring is disposed between an upper disc surface of the disc and the cap. The spring is configured to bias the cap away from the upper disc surface to thereby pull the head portion of the fastener and the blade toward the lower disc surface.

11 Claims, 7 Drawing Sheets

(56) References Cited

U.S. PATENT DOCUMENTS

| | | | | |
|---|---|---|---|---|
| 8,844,658 | B2 * | 9/2014 | Wyatt .................... | A01D 34/64<br>180/443 |
| 10,117,379 | B2 | 11/2018 | Guiet et al. | |
| 2023/0397529 | A1 | 12/2023 | Teach | |

* cited by examiner

ROTATING MOWER BLADE ASSEMBLY WITH COMPRESSION SPRING BLADE RETENTION

TECHNICAL FIELD

The disclosure generally relates to a rotating blade assembly for a mower implement, and more particularly to a cutter blade of the rotating blade assembly.

BACKGROUND

A cutter bar style mower implement includes a cutter bar having a plurality of rotating blade assemblies attached thereto. The cutter bar includes a drive for rotating the blade assemblies. The drive rotates each respective rotating blade assembly about a respective rotation axis for cutting crop material.

Each blade assembly may include a disc that is attached to and driven or rotated by the drive. The disc extends radially outward from the respective rotation axis to a radially outer disc edge. One or more blades may be attached to the disc proximate the radially outer disc edge. Each blade may be rotatably attached to the disc to allow free rotational movement of the blade relative to the disc. Centrifugal force during operation causes the blade to extend radially outward from the rotation axis. However, the rotatable connection between the blade and the disc enables the blade to deflect or rotate relative to the disc when an object, e.g., a rock or a stump, is encountered.

The blades are a wear item, which require occasional replacement. In order to enable easy replacement of the blades, the rotating blade assembly may be configured with a quick attach blade system. For example, the rotating blade assembly may include a spring plate coupled to the disc, with the blade positioned between the disc and the spring plate. The spring plate extends radially outward from respective rotation axis of the disc to a radially outer plate edge. A retaining bolt may be attached to the disc, and include a distal end engaged within a pocket of the spring plate. The retaining pin extends between both the disc and the spring plate. The retaining bolt includes a shaft portion that passes through a pin aperture of a respective blade. The blade may rotate about the shaft portion, with the retaining pin securing the blade relative to the disc and the spring plate.

The spring plate provides a spring force biased toward the disc, such that the spring plate presses against the distal end of the retaining pin, thereby capturing the retaining pin between the disc and the spring plate. A specialized tool may be positioned between the spring plate and the disc and used as a lever to deflect the spring plate away from the disc and disengage the spring plate from the distal end of the retaining pin, thereby providing space between the spring plate and the distal end of the retaining pin and allowing a worn blade to be removed and a new blade to be installed.

SUMMARY

A rotating blade assembly for a mower implement is provided. The rotating blade assembly includes a disc defining a rotation axis. The disc extends radially outward away from the rotation axis to a radial outer disc edge. The disc includes an upper disc surface and a lower disc surface, and defines a mounting aperture extending therethrough. The mounting aperture is disposed proximate the radial outer disc edge. A blade includes a body having a lower blade surface and an upper blade surface. The upper blade surface of the blade is arranged opposite the lower disc surface of the disc. The body of the blade defines a pin aperture extending therethrough. A fastener includes a head portion and a shaft portion. The head portion of the fastener engages the lower blade surface. The shaft portion of the fastener extends through the pin aperture of the blade and the mounting aperture of the disc to a distal end of the shaft portion. A cap is coupled to the distal end of the shaft portion of the fastener. A spring is disposed between the upper disc surface of the disc and the cap. The spring is configured to bias the cap away from the upper disc surface to thereby pull the head portion of the fastener and the blade toward the lower disc surface.

In one aspect of the disclosure, the body of the blade may define a pin slot extending from the pin aperture to a radial inner edge of the body. The pin aperture defines an aperture diameter, and the pin slot defines a slot width parallel to the radial inner edge of the body and perpendicular to the rotation axis of the disc. The aperture diameter is greater than the slot width. The shaft portion of the fastener may include a cylindrical portion abutting the head portion of the fastener, and an angulated portion positioned proximate the cylindrical portion, between the cylindrical portion and the distal end of the shaft portion. The angulated portion includes first planar surface and a second planar surface arranged in parallel and extending along a central longitudinal axis of the shaft portion. The first planar surface and the second planar surface define a pin width therebetween. The pin width is less than the slot width, whereby the angulated portion of the fastener may pass through the slot. The cylindrical portion defines a cylinder diameter that is less than the aperture diameter and greater than the slot width. Because the cylinder diameter is greater than the slot width, the cylindrical portion is unable to pass through the pin slot. However, because the cylinder diameter is less than the aperture diameter, the cylindrical portion may move axially within the mounting aperture.

In one aspect of the disclosure, the lower disc surface defines a recessed pocket. The recessed pocket is sized and shaped to receive the angulated portion of the fastener therein in nested interlocking engagement therewith to prevent rotation of the fastener relative to the disc. A spring force generated by the spring secures the blade relative to the disc, with the angulated portion of the fastener interlocking with the recessed pocket of the disc.

In one aspect of the disclosure, the spring is compressible to a compressed height in response to an applied axial force directed along a central longitudinal axis of the shaft portion of the fastener. Compression of the spring to the compressed height allows the head portion of the fastener and the blade to move away from the lower disc surface of the disc, along the rotation axis, whereby the angulated portion of the fastener is disengaged from the recessed pocket of the disc. The blade may then be raised up relative to the fastener such that the pin aperture of the blade disengages the cylindrical portion of the fastener and the angulated portion of the fastener is aligned with the pin slot. The blade may then be removed by passing the angulated portion through the pin slot. Installation of a replacement blade may be accomplished in reverse order.

In one aspect of the disclosure, the spring may be a compression spring. In one example implementation, the spring includes a resilient bushing defining a central aperture receiving the shaft portion of the fastener therethrough. The resilient bushing may be manufactured from an elastomer, such as but not limited to a urethane, or a rubber or rubberlike material. In other implementations, the spring may be configured differently. For example, the spring may be configured as a coil spring, a wave spring, etc.

In one implementation of the disclosure, the shaft portion of the fastener may include a male threaded portion, and the cap may include a female threaded portion. The female threaded portion of the cap is disposed in threaded engagement with the male threaded portion of the fastener, thereby securing the cap to the fastener.

Accordingly, by placing the spring above the disc, between the upper surface of the disc and the cap, the rotating blade assembly described herein provides a quick attach/detach functionality for changing the blade without a traditional spring plate of prior art assemblies that was disposed below the blade and the disc. As such, the rotating blade assembly described herein reduces weight and manufacturing complexity compared to prior art rotating blade assemblies, and eliminates possible distortion of the disc the traditional spring plates may have caused in the prior art rotating blade assemblies.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
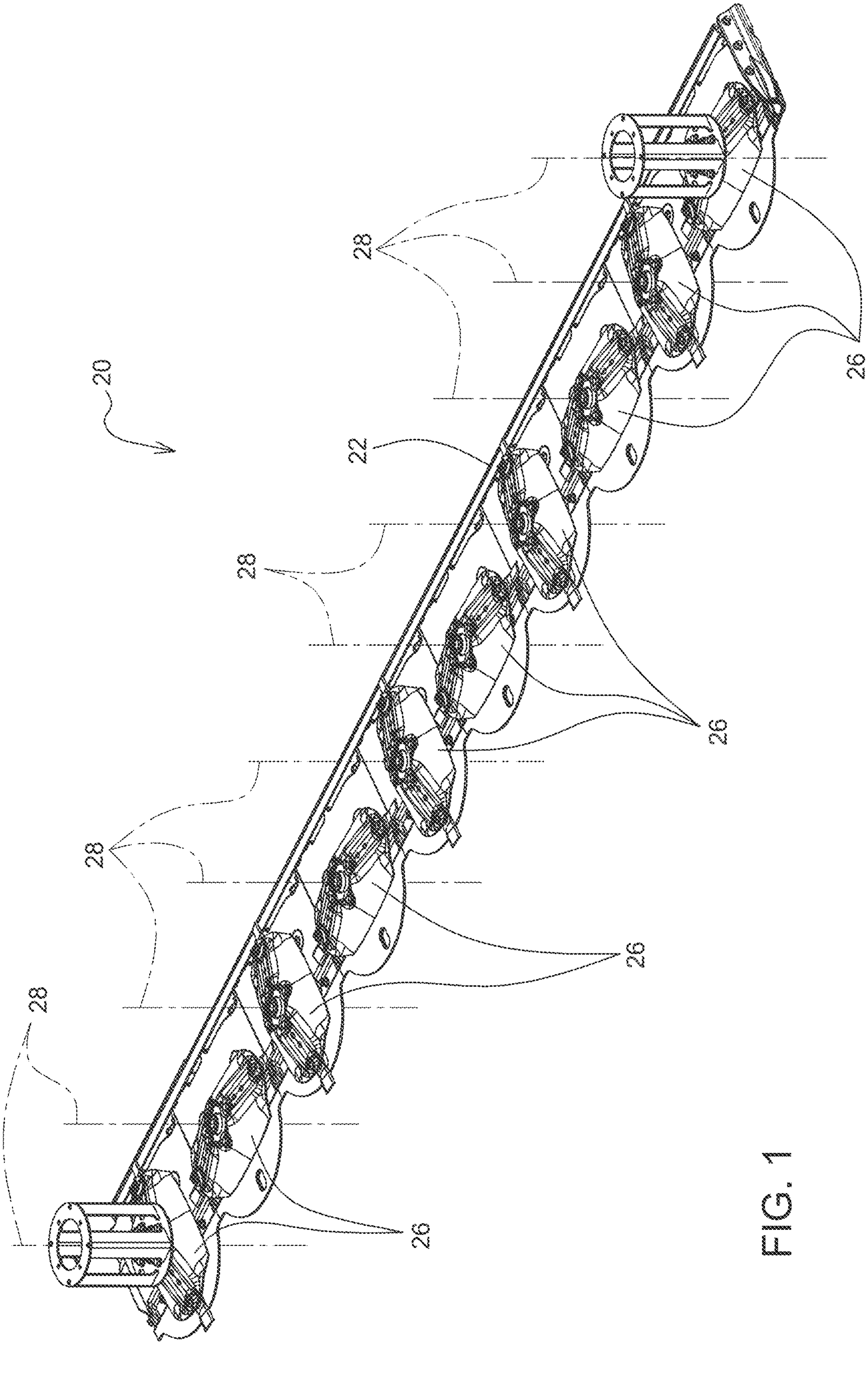
FIG. 1 is a schematic perspective view of a mower implement.

Referring to the Figures, wherein like numerals indicate like parts throughout the several views, a mower implement is generally shown at 20 in FIG. 1. The example implementation of the mower implement 20 shown in the Figures and described herein is configured to be attached to and powered by a traction unit, such as but not limited to a tractor or other similar vehicle. However, in other implementations, the mower implement 20 may be integrated with and/or mounted at the forward end of the traction unit, i.e., a self-propelled mower implement 20.

Referring to FIG. 1, the mower implement 20 includes a cutter bar 22 having a plurality of rotating blade assemblies 26 attached thereto. The cutter bar 22 includes a drive mechanism 24 (shown in FIGS. 3 and 4) for rotating the blade assemblies 26. The drive mechanism 24 rotates each respective rotating blade assembly 26 about a respective rotation axis 28 for cutting crop material, such as but not limited to, hay, alfalfa, grasses, etc. The components, features, and operation of the cutter bar 22 and the drive mechanism 24 that rotates each of the respective rotating blade assemblies 26 is understood by those skilled in the art, is not pertinent to the teachings of his disc 30losure, and therefore not described in greater detail herein.

Figure 2:
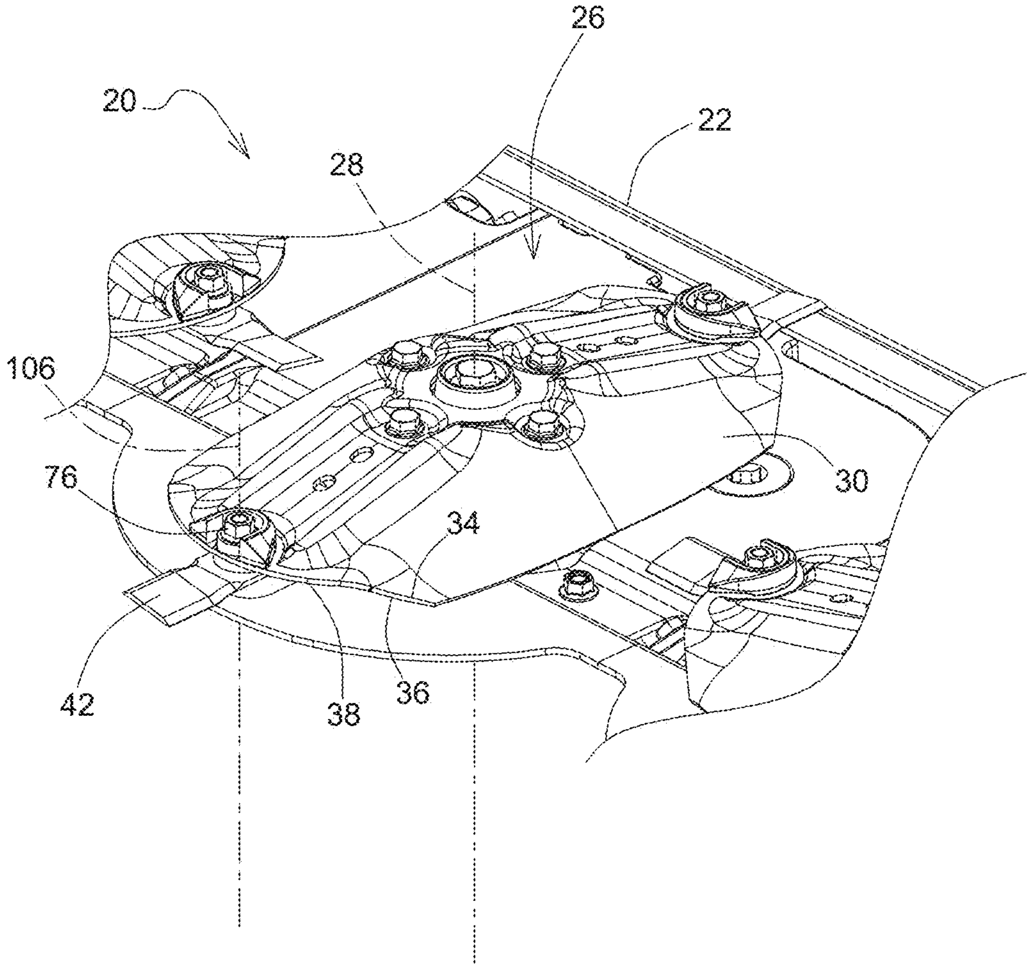
FIG. 2 is a schematic perspective view of a rotating blade assembly of the mower implement.
Figure 3:
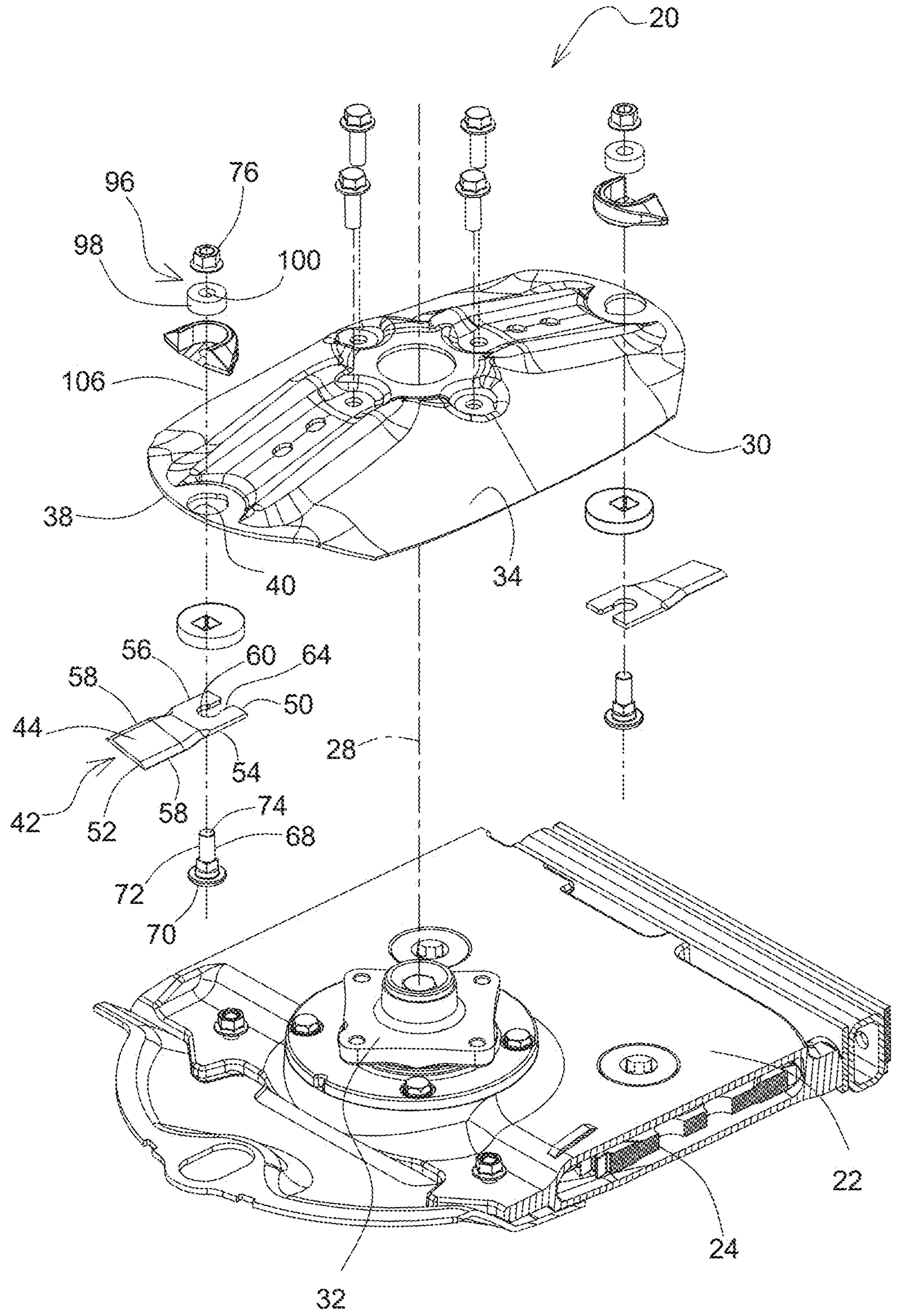
FIG. 3 is a schematic exploded perspective view of the rotating blade assembly.
Figure 4:
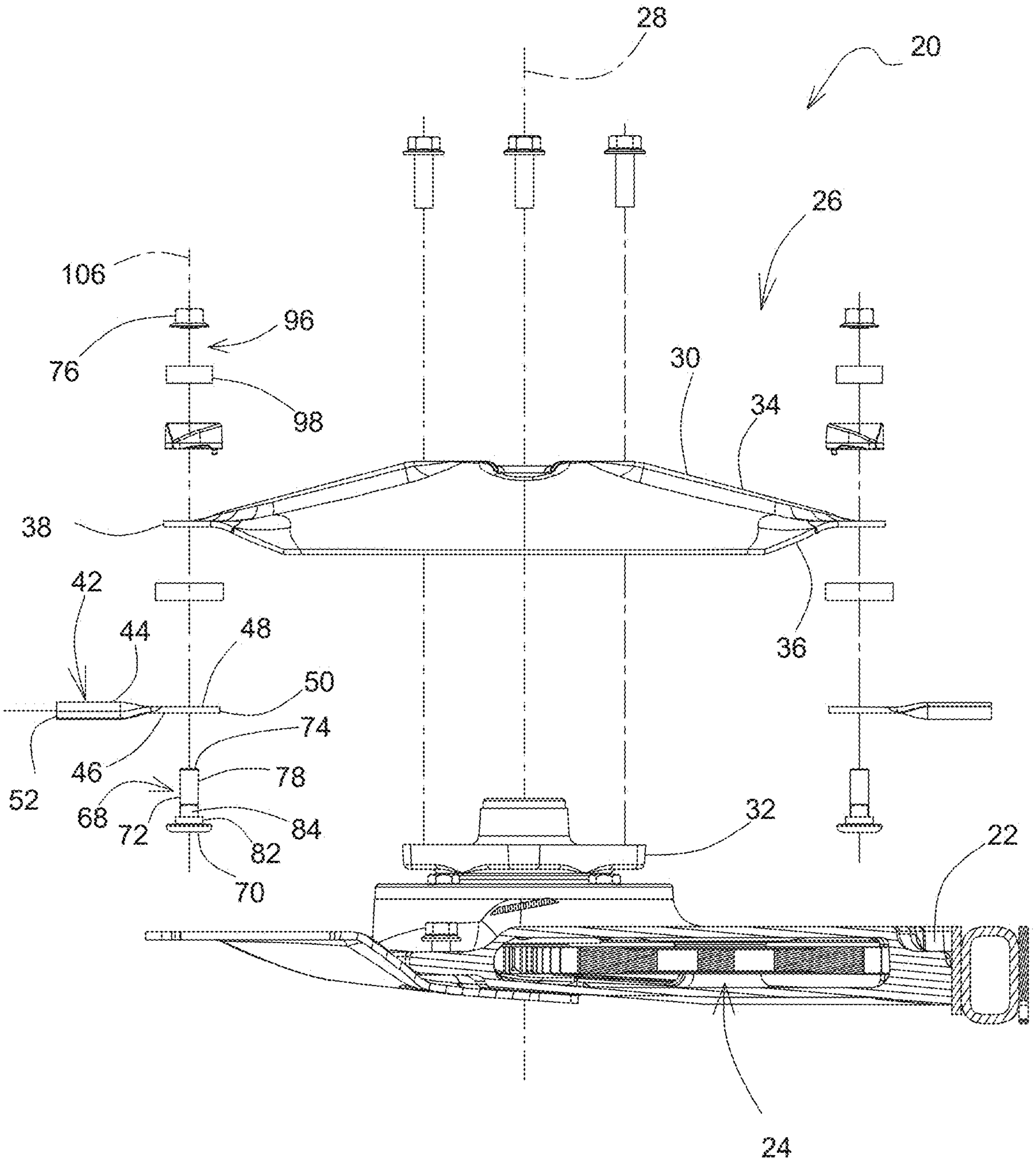
FIG. 4 is a schematic exploded cross sectional view of the rotating blade assembly.

Referring to FIGS. 2-4, a rotating blade assembly 26 of the mower implement 20 is generally shown. While only a single rotating blade assembly 26 is shown in detail and described below, it should be appreciated that all of the rotating blade assemblies 26 of the mower implement 20 may be similarly constructed. The rotating blade assembly 26 includes a disc 30 that is drivenly attached to the drive mechanism 24 of the cutter bar 22. For example, the disc 30 may be attached to a respective flange 32, which is in turn attached to and driven by the drive mechanism 24 of the cutter bar 22. The disc 30 is driven by the drive mechanism 24 of the cutter bar 22 for rotation about its respective rotation axis 28. The rotation axis 28 of the disc 30 extends generally orthogonal to the disc 30. In normal operation of the mower implement 20, in which crop material is cut, the disc 30 is arranged substantially parallel to a ground surface, with the rotation axis 28 of the disc 30 extending generally vertically.

The disc 30 includes a rigid, platelike structure having a first or upper disc surface 34, and a second or lower disc surface 36. The lower disc surface 36 is positioned toward the cutter bar 22, whereas the upper disc surface 34 is positioned away from the cutter bar 22. The platelike structure of the disc 30 is substantially inflexible. For example, the disc 30 may be manufactured from steel plate having a thickness and shape to prevent or limit deflection during operation. The example implementation of the disc 30 shown in the Figures and described herein includes the disc 30 defining a generally oval shape. However, it should be appreciated that the disc 30 may include some other shape not shown or described herein.

The disc 30 extends radially outward away from the rotation axis 28 to a radially outer disc edge 38. The disc 30 defines a mounting aperture 40 proximate the radially outer disc edge 38. In the example implementation of the disc 30 shown in the Figures and described herein, the mounting aperture 40 is positioned along a long dimension of the oval shape, near the radially outer disc edge 38. The mounting aperture 40 extends through the disc 30, between the upper disc surface 34 and the lower disc surface 36, in a direction substantially parallel with the rotation axis 28 of the disc 30.

Figure 5:
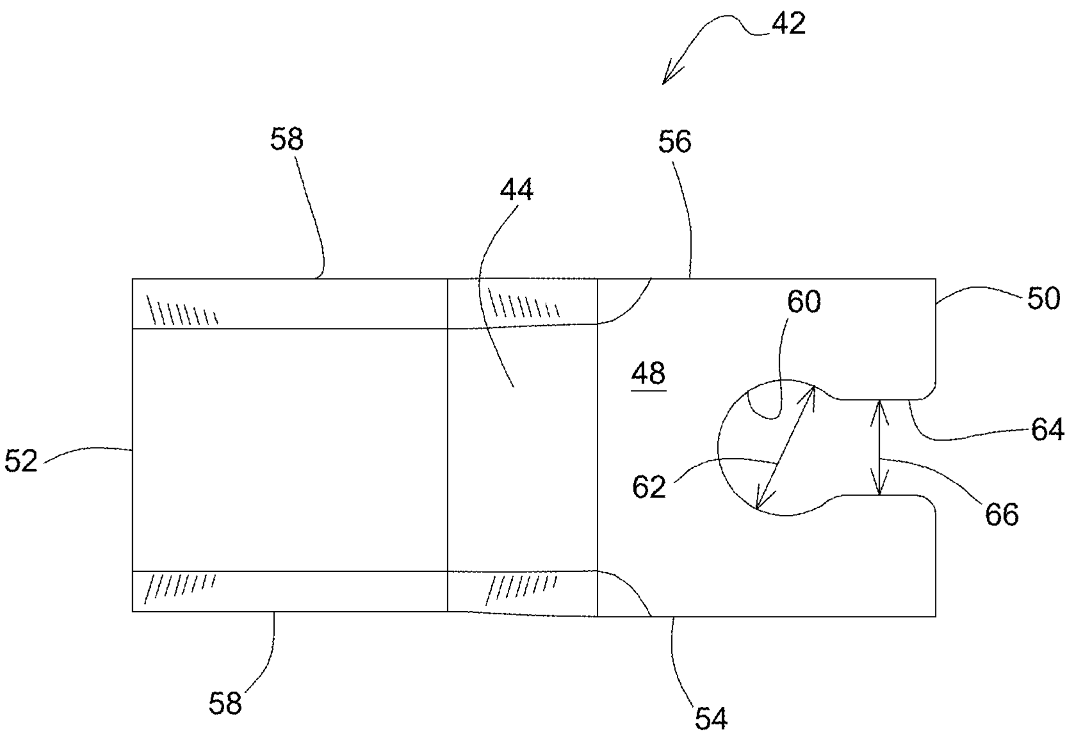
FIG. 5 is a schematic plan view of a blade of the rotating blade assembly.

Referring to FIGS. 2-4, a cutting blade 42 is attached to the disc 30. The blade 42 includes a body 44 having a lower blade surface 46 and an opposing upper blade surface 48. The upper blade surface 48 of the blade 42 is arranged opposite the lower disc surface 36 of the disc 30. Referring to FIG. 5, the body 44 of the blade 42 further includes and/or defines a radially inner edge 50 and a radially outer edge 52. The radially inner edge 50 is positioned nearer the rotation axis 28 of the disc 30 than the radially outer edge 52. A first side edge 54 extends between the radially inner edge 50 and the radially outer edge 52. A second side edge 56 extends between the radially inner edge 50 and the radially outer edge 52. At least one of the first side edge 54 and the second side edge 56 defines a knife edge 58 formed for cutting crop material. In the example implementation shown in the Figures, both the first side edge 54 and the second side edge 56 define a respective knife edge 58, such that the blade 42 may be flipped to present a second knife edge 58 when a first knife edge 58 has been dulled.

The body 44 of the blade 42 defines a pin aperture 60 extending therethrough, between the lower blade surface 46 and the upper blade surface 48. The pin aperture 60 is positioned proximate the radially inner edge 50 of the body 44. The pin aperture 60 defines an aperture diameter 62. The body 44 of the blade 42 may further define a pin slot 64 extending from the pin aperture 60 to the radial inner edge of the body 44. The pin slot 64 defines a slot width 66 extending generally parallel to the radial inner edge of the body 44, in a direction transverse to the rotation axis 28 of the disc 30. The aperture diameter 62 of the pin aperture 60 is greater than the slot width 66 of the pin slot 64.

Figure 6:
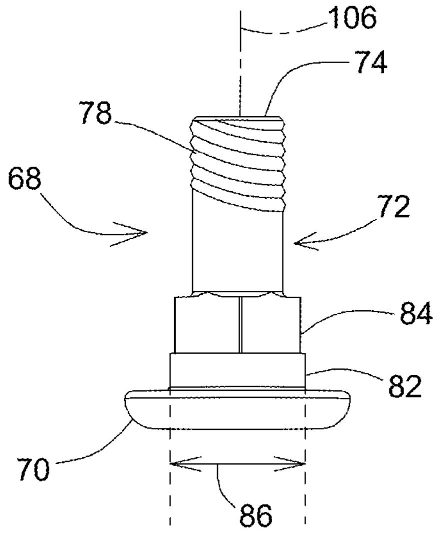
FIG. 6 is a schematic side view of a fastener of the rotating blade assembly.
Figure 7:
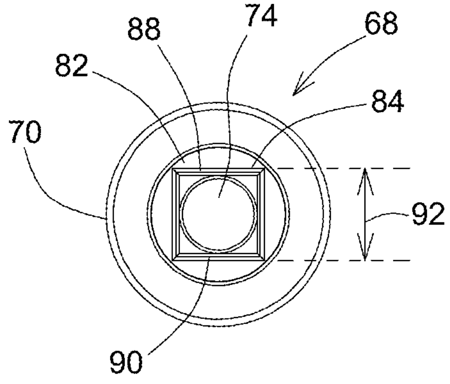
FIG. 7 is a schematic end view of the fastener.

Referring to FIGS. 2-4, a fastener 68 couples the blade 42 to the disc 30. Referring also to FIGS. 6 and 7, the fastener 68 includes a head portion 70 and a shaft portion 72. The head portion 70 of the fastener 68 is disposed adjacent and engages the lower blade surface 46. The shaft portion 72 of the fastener 68 extends through the pin aperture 60 of the blade 42 and the mounting aperture 40 of the disc 30 to a distal end 74 of the shaft portion 72. As shown in FIGS. 2-4, a cap 76 is coupled to the distal end 74 of the shaft portion 72 of the fastener 68 to secure the blade 42 relative to the disc 30. In the example implementation shown in the Figures and described herein, the shaft portion 72 of the fastener 68 includes a male threaded portion 78, and the cap 76 includes a female threaded portion 80. The female threaded portion 80 of the cap 76 is disposed in threaded engagement with the male threaded portion 78 of the fastener 68. It should be appreciated that the cap 76 may be attached to the fastener 68 in some other manner than the example implementation of the threaded engagement described herein.

Referring to FIGS. 6-7, the shaft portion 72 of the fastener 68 includes a cylindrical portion 82 abutting the head portion 70 of the fastener 68, and an angulated portion 84 positioned proximate the cylindrical portion 82, between the cylindrical portion 82 and the distal end 74 of the shaft portion 72. The cylindrical portion 82 of the fastener 68 defines a cylinder diameter 86 that is less than the aperture diameter 62 of the pin aperture 60 and greater than the slot width 66 of the pin slot 64. As such, the cylindrical portion 82 of the fastener 68 may be received within the pin aperture 60, but not within the pin slot 64.

The angulated portion 84 of the fastener 68 includes a first planar surface 88 and a second planar surface 90 arranged in parallel with each other, and extending along a central longitudinal axis 106 of the shaft portion 72, generally parallel with the axis of rotation of the disc 30. The first planar surface 88 and the second planar surface 90 define a pin width 92 therebetween, i.e., a distance between the first planar surface 88 and the second planar surface 90. The pin width 92 of the angulated portion 84 of the fastener 68 is less than the slot width 66 of the pin slot 64, such that the angulated portion 84 of the fastener 68, when orientated with the first planar surface 88 and the second planar surface 90 perpendicular to the slot width 66, may pass through the pin slot 64.

Figure 8:
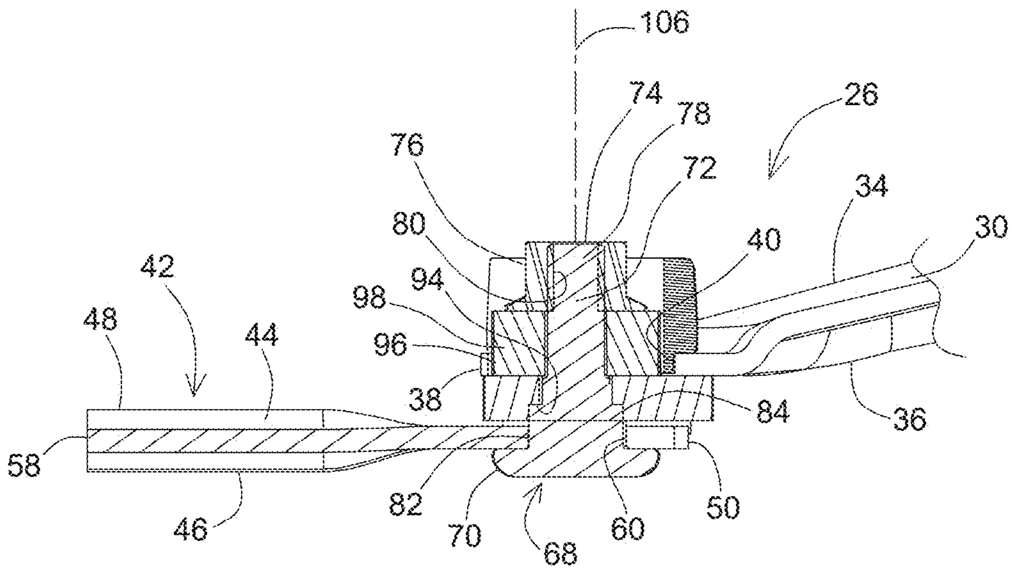
FIG. 8 is a schematic cross sectional view of the rotating blade assembly in an operating configuration.
Figure 9:
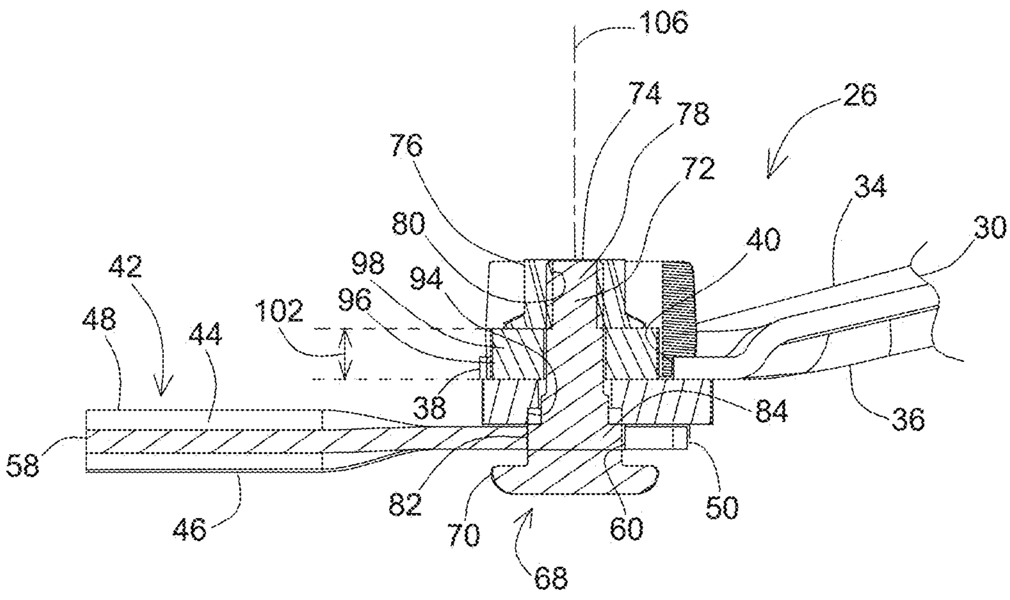
FIG. 9 is a schematic cross sectional view of the rotating blade assembly showing a spring compressed to release the blade from the rotating blade assembly.

Referring to FIGS. 8 and 9, the lower disc surface 36 defines a recessed pocket 94. The recessed pocket 94 is sized and shaped to receive the angulated portion 84 of the fastener 68 therein in nested interlocking engagement therewith. The nested interlocking engagement between the angulated portion 84 of the fastener 68 and the recessed pocket 94 of the disc 30 prevents rotation of the fastener 68 relative to the disc 30. It should be appreciated that the recessed pocket 94 includes a shape substantially identical too but slightly larger than a cross sectional shape of the angulated portion 84 of the fastener 68, such that the angulated portion 84 may nest within the recessed pocket 94 without significant movement therebetween.

As best shown in FIGS. 8 and 9, a spring 96 is disposed between the upper disc surface 34 of the disc 30 and the cap 76. The spring 96 is configured to bias the cap 76 away from the upper disc surface 34 to thereby pull the head portion 70 of the fastener 68 and the blade 42 toward the lower disc surface 36. As used herein, the term "spring 96" is defined as a device having an elastic body 44 that recovers its original shape when released after being distorted, and which is capable of exerting a force in response to being compressed from an initial state. As such, the spring 96 may be considered a compression spring 96 that applies and outward force in response to a compressive force.

In one example implementation, the spring 96 may include a resilient bushing 98 defining a central aperture 100 receiving the shaft portion 72 of the fastener 68 therethrough. The resilient bushing 98 may include an elastomer, such as but is not limited to, a urethane, a rubber material or a rubber-like material. In other implementations, the spring 96 may be configured differently. For example, the spring 96 may be configured as a coil spring 96, a wave spring 96, a Bellville spring 96, etc.

As shown in FIG. 8, the position of the cap 76 along the shaft portion 72 of the fastener 68 may be adjusted to bias the angulated portion 84 of the fastener 68 tightly within the recessed pocket 94 of the disc 30. When so adjusted, the head portion 70 of the fastener 68 holds the blade 42 in position relative to the disc 30, with the cylindrical portion 82 of the fastener 68 nested within the pin aperture 60 of the blade 42. Because the cylinder diameter 86 of the cylindrical portion 82 is greater than the pin width 92 of the pin slot 64, the cylindrical portion 82 of the fastener 68 is trapped within the pin aperture 60 and is prevented from moving through the pin slot 64, thereby holding the blade 42 in position relative to the disc 30.

Figure 10:
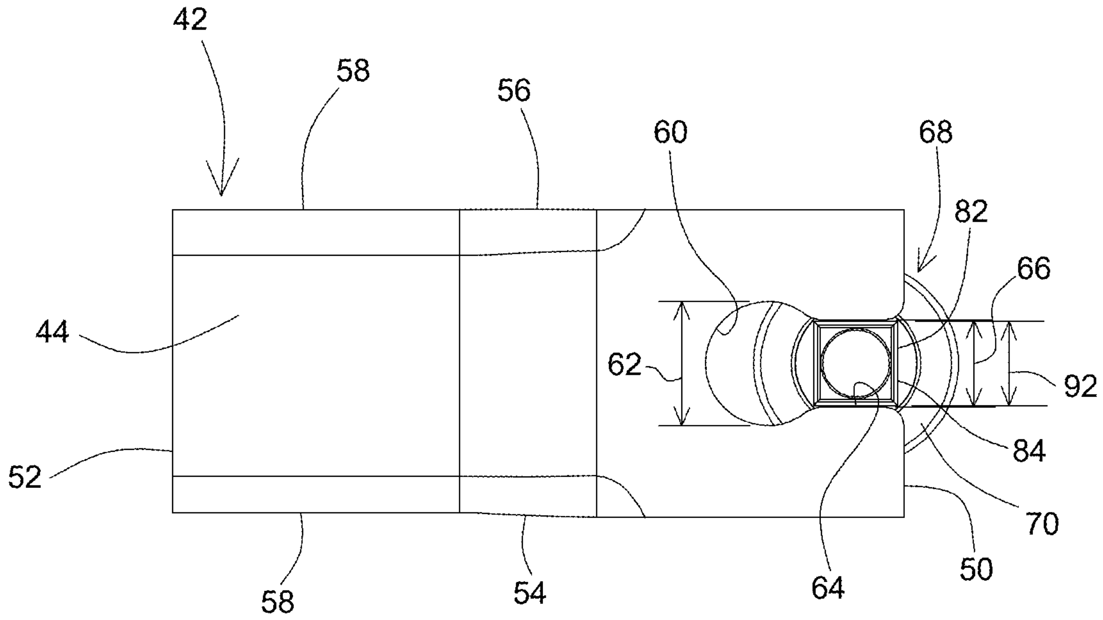
FIG. 10 is a schematic plan view of the blade partially removed from the fastener.
Figure 11:
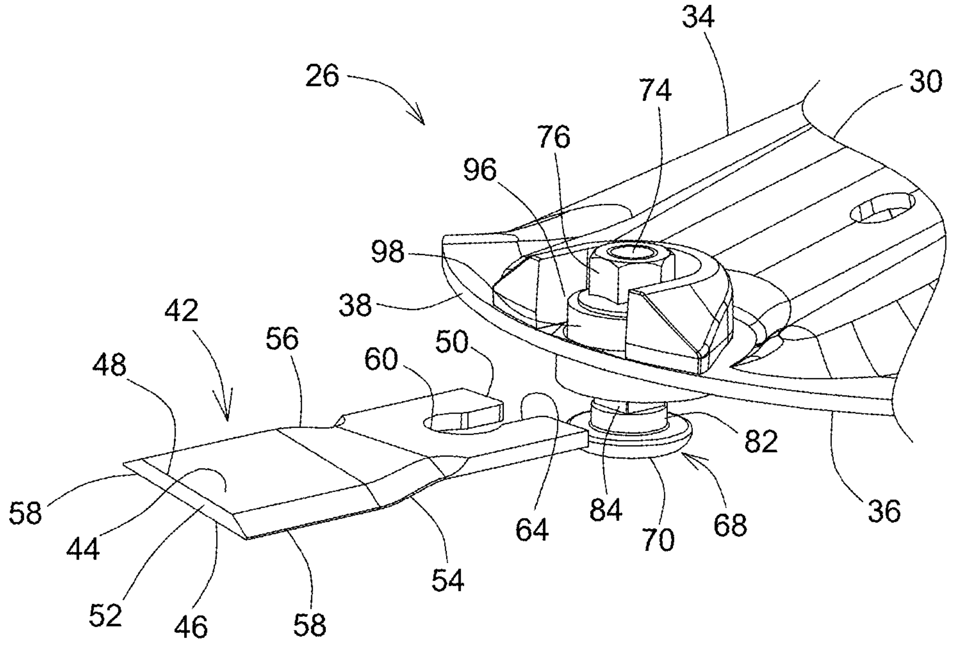
FIG. 11 is a schematic perspective view of the rotating blade assembly showing the spring compressed and the blade removed from the fastener.

Referring to FIG. 9, the spring 96 is compressible to a compressed height 102 in response to an applied axial force 104 directed along the central longitudinal axis 106 of the shaft portion 72 of the fastener 68. A specialized tool may be used to apply the requisite axial force to compress the spring 96 to the compressed height 102. Compression of the spring 96 to the compressed height 102 allows the head portion 70 of the fastener 68 and the blade 42 to move away from the lower disc surface 36 of the disc 30, along the rotation axis 28, whereby the angulated portion 84 of the fastener 68 is disengaged from the recessed pocket 94 of the disc 30. The blade 42 may then be raised up relative to the fastener 68 such that the pin aperture 60 of the blade 42 disengages the cylindrical portion 82 of the fastener 68 and the angulated portion 84 of the fastener 68 is aligned with the pin slot 64. As shown in FIGS. 10 and 11, because the pin width 92 between the first planar surface 88 and the second planar surface 90 of the angulated portion 84 of the fastener 68 is less than the slot width 66 of the pin slot 64, the blade 42 may be removed by passing the angulated portion 84 through the pin slot 64. Installation of a replacement blade 42 may be accomplished in reverse order.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A rotating blade assembly for a mower implement, the rotating blade assembly comprising:
- a disc defining a rotation axis and extending radially outward away from the rotation axis to a radial outer disc edge, wherein the disc includes an upper disc surface and a lower disc surface, and defines a mounting aperture extending therethrough, with the mounting aperture disposed proximate the radial outer disc edge;
- a blade having a body including a lower blade surface and an upper blade surface, with the upper blade surface arranged opposite the lower disc surface, wherein the body of the blade defines a pin aperture extending therethrough;
- a fastener having a head portion engaging the lower blade surface, and a shaft portion extending through the pin aperture of the blade and the mounting aperture of the disc to a distal end thereof;
- a cap coupled to the distal end of the shaft portion of the fastener;
- a spring disposed between the upper disc surface and the cap, wherein the spring is configured to bias the cap away from the upper disc surface to thereby pull the head portion of the fastener and the blade toward the lower disc surface; and
- wherein the shaft portion of the fastener includes a cylindrical portion abutting the head portion of the fastener, and an angulated portion positioned proximate the cylindrical portion, between the cylindrical portion and the distal end of the shaft portion, wherein the angulated portion includes a first planar surface and a second planar surface arranged in parallel and extending along a central longitudinal axis of the shaft portion.

2. The rotating blade assembly set forth in claim 1, wherein the body of the blade defines a pin slot extending from the pin aperture to a radial inner edge of the body.

3. The rotating blade assembly set forth in claim 1, wherein the spring includes a resilient bushing defining a central aperture receiving the shaft portion of the fastener therethrough.

4. The rotating blade assembly set forth in claim 1, wherein the shaft portion of the fastener includes a male threaded portion, and wherein the cap includes a female threaded portion, with the female threaded portion of the cap disposed in threaded engagement with the male threaded portion of the fastener.

5. The rotating blade assembly set forth in claim 1, wherein the lower disc surface defines a recessed pocket shaped to receive the angulated portion of the fastener therein in nested interlocking engagement therewith.

6. The rotating blade assembly set forth in claim 5, wherein the spring is compressible in response to an applied axial force directed along the central longitudinal axis of the shaft portion to a compressed height allowing disengagement of the angulated portion of the fastener and the recessed pocket of the disc, whereby the blade is removeable by passing the angulated portion through the pin slot.

7. The rotating blade assembly set forth in claim 1, wherein the first planar surface and the second planar surface define a pin width therebetween, wherein the pin width is less than the slot width.

8. The rotating blade assembly set forth in claim 1, wherein the cylindrical portion defines a cylinder diameter that is less than the aperture diameter and greater than the slot width.

9. The rotating blade assembly set forth in claim 1, wherein the spring is a compression spring.

10. A rotating blade assembly for a mower implement, the rotating blade assembly comprising:
- a disc defining a rotation axis and extending radially outward away from the rotation axis to a radial outer disc edge, wherein the disc includes an upper disc surface and a lower disc surface, and defines a mounting aperture extending therethrough, with the mounting aperture disposed proximate the radial outer disc edge;
- a blade having a body including a lower blade surface and an upper blade surface, with the upper blade surface arranged opposite the lower disc surface, wherein the body of the blade defines a pin aperture extending therethrough;
- a fastener having a head portion engaging the lower blade surface, and a shaft portion extending through the pin aperture of the blade and the mounting aperture of the disc to a distal end thereof;

a cap coupled to the distal end of the shaft portion of the fastener;

a spring disposed between the upper disc surface and the cap, wherein the spring is configured to bias the cap away from the upper disc surface to thereby pull the head portion of the fastener and the blade toward the lower disc surface;

wherein the body of the blade defines a pin slot extending from the pin aperture to a radial inner edge of the body; and wherein the pin aperture defines an aperture diameter, and the pin slot defines a slot width parallel to the radial inner edge of the body and perpendicular to the rotation axis of the disc, wherein the aperture diameter is greater than the slot width.

11. A rotating blade assembly for a mower implement, the rotating blade assembly comprising:

a disc defining a rotation axis and extending radially outward away from the rotation axis to a radial outer disc edge, wherein the disc includes an upper disc surface and a lower disc surface, and defines a mounting aperture extending therethrough, with the mounting aperture disposed proximate the radial outer disc edge;

a blade having a body including a lower blade surface and an upper blade surface, with the upper blade surface arranged opposite the lower disc surface, wherein the body of the blade defines a pin aperture extending therethrough;

a fastener having a head portion engaging the lower blade surface, and a shaft portion extending through the pin aperture of the blade and the mounting aperture of the disc to a distal end thereof;

a cap coupled to the distal end of the shaft portion of the fastener;

a spring disposed between the upper disc surface and the cap, wherein the spring is configured to bias the cap away from the upper disc surface to thereby pull the head portion of the fastener and the blade toward the lower disc surface;

wherein the body of the blade defines a pin slot extending from the pin aperture to a radial inner edge of the body;

wherein the pin aperture defines an aperture diameter, and the pin slot defines a slot width parallel to the radial inner edge of the body and perpendicular to the rotation axis of the disc, wherein the aperture diameter is greater than the slot width; and wherein the shaft portion of the fastener includes a cylindrical portion abutting the head portion of the fastener, and an angulated portion positioned proximate the cylindrical portion, between the cylindrical portion and the distal end of the shaft portion, wherein the angulated portion includes a first planar surface and a second planar surface arranged in parallel and extending along a central longitudinal axis of the shaft portion.

* * * * *